United States Patent [19]

Gjaja

[11] 3,866,073

[45] Feb. 11, 1975

[54] COMPOSITE CONFORMABLE SUPPORT STRUCTURE ELEMENT

[75] Inventor: Niko V. Gjaja, Schenectady, N.Y.

[73] Assignee: General Electric Company, Schenectady, N.Y.

[22] Filed: May 3, 1973

[21] Appl. No.: 356,710

Related U.S. Application Data

[63] Continuation of Ser. No. 152,679, June 14, 1971, abandoned.

[52] U.S. Cl................ 310/260, 161/155, 161/166, 161/184, 161/231, 248/9, 248/22, 248/350, 248/358 R, 310/270
[51] Int. Cl. ........................ H02k 5/24, B32b 27/38
[58] Field of Search ........... 161/184, 231, 232, 226, 161/239, 244, 165, 166, 152, 155, 156; 248/9, 22, 350, 358 R; 310/260, 270

[56] References Cited

UNITED STATES PATENTS

| | | | |
|---|---|---|---|
| 1,778,185 | 10/1930 | Devries | 161/244 X |
| 1,961,745 | 6/1934 | Eckhardt | 161/156 |
| 2,809,145 | 10/1957 | McDermott | 161/154 X |
| 3,036,948 | 3/1962 | Danielson | 161/184 |
| 3,255,061 | 6/1966 | Dobbs | 161/170 |
| 3,401,907 | 9/1968 | McDermott | 161/155 X |
| 3,449,609 | 6/1969 | Thiessen et al. | 310/260 |
| 3,454,805 | 7/1969 | Fromm et al. | 310/260 |
| 3,665,234 | 5/1972 | Bishop | 310/260 |
| 3,729,205 | 4/1973 | Kwok | 161/175 X |

*Primary Examiner*—Harold Ansher
*Attorney, Agent, or Firm*—John F. Ahern; James W. Mitchell

[57] ABSTRACT

An insulating support element is provided for the end winding of a dynamoelectric machine which provides restraint in the radial direction while permitting low cycle movement in the axial direction in response to thermal expansions and contractions. The element is in the form of a bonded sandwich including top and bottom relatively thick plies of a felt material with a relatively thin elastomeric material therebetween. The freedom of motion is restricted to a well defined plane and direction determined by the orientation of the elastomeric material. The amount of motion is determined by the size and elastic properties of the elastomeric material chosen.

7 Claims, 2 Drawing Figures

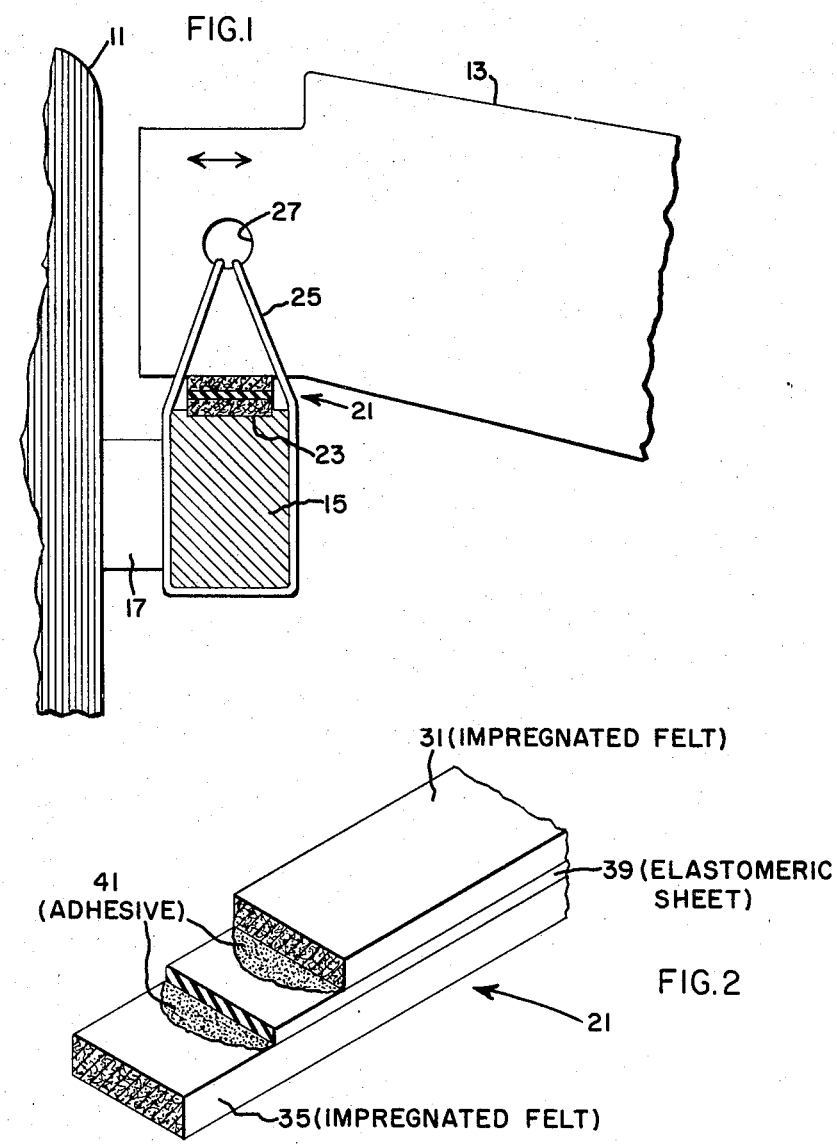

COMPOSITE CONFORMABLE SUPPORT STRUCTURE ELEMENT

This is a continuation of application Ser. No. 152,679, filed June 14, 1971, now abandoned.

BACKGROUND OF THE INVENTION

This invention relates generally to support structures for the end winding region of a dynamoelectric machine, and in particular, it relates to a composite spacer element which allows low cycle motion in a single plane.

The end winding region of a dynamoelectric machine is subjected to various stresses due to vibration, short circuit and thermal expansion. Support structures are designed to restrict motion due to these stresses. This restriction manifests itself in the form of a rigid cage type of structure which inhibits radial movement within the end winding, and, in finding suitable engineering solutions for allowing low cycle axial motion due to thermal expansion. One such solution is exhibited in U.S. Pat. No. 3,089,048 to Bahn et al issued May 7, 1963 and assigned to the assignee of the present invention. As shown in FIG. 3 of that patent, a bracket has been devised to slidably secure support arm 12. A pin 29 slides within a metallic bracket 25 and thereby allows the necessary unidirection, low frequency, axial movement due to thermal expansion of electrical members. This solution, while effective, is relatively complex, requiring special parts, and also interrupts the insulation scheme as brackets are fabricated from metal.

A difficulty occurs when insulated electrical conductors are made to slide against the ordinary Glaskyd sausage which appears in the prior art. "Glaskyd 1901" is a trade name for a thermosetting resin sold by American Cyanamid Co., Perrysburg, Ohio and used in fabricating sausage type spacing blocks. The problem exhibits itself in the form of severely abraded insulation about the conducting members. A tentative solution proposed to wrap the Glaskyd sausage in a rubber sleeve. However, this solution does not provide as effective unidirectional flexibility as does the present invention.

Still another difficulty with the use of a rubber encased Glaskyd sausage is the limited shelf life of the Glaskyd element. Since Glaskyd is a thermosetting resin, it begins to cure as soon as the sausage is formed. Thus, after a certain time, the sausage would then become hard and nonconformable.

In U.S. Pat. application No. 97,777 now U.S. Pat. No. 3,665,234 filed on Dec. 14, 1970 by James S. Bishop and assigned to the assignee of the present application, there is shown a spacer block having a solid insulating member having a deformed surface sandwiched between a conformable absorbent material which is impregnated with a curable resin. In U.S. Pat. No. 3,454,805 to Fromm et al, issued July 8, 1969, a spacer block is shown comprising a pad of compressible absorbent material sandwiched between two relatively solid insulating members which facilitates installation of the spacer. Another U.S. Pat. No. 3,449,609 granted to Thiessen, Drabik and Stigler on June 10, 1969 shows a spacer block made of hard insulating material with a plastic insert. While all of the above seems to be generically pertinent, it is felt that they do not anticipate the present construction nor do they render it obvious.

OBJECTS OF THE INVENTION

It is therefore one object of this invention to provide an insulating support element which will resist movement in a radial direction while permitting low cycle unidirectional axial movement due to thermal expansions and contractions.

It is another object of this invention an insulating support element the size and flexibility of which may be easily varied.

Another object of this invention is to provide an end winding support element consistent with an all insulating end winding support scheme.

It is still another object of this invention to provide an insulating support member which has an unlimited shelf life and is easily assembled.

Other objects, advantages and features of the present invention will become apparent from the following description of a preferred embodiment thereof when taken in connection with the accompanying drawings.

BRIEF DESCRIPTION OF THE DRAWING

FIG. 1 is a side elevation view of an end winding support structure with the present invention applied thereto and the arrows indicating the permitted direction of movement.

FIG. 2 is an isometric, partially-sectioned, view of the present invention.

SUMMARY OF THE INVENTION

An insulating structural support spacer element in the form of an insulating bonded sandwich construction having two soft relatively thick outer plies with a relatively thin elastomeric material positioned therebetween. Upon application to a dynamoelectric machine end winding assembly the outer plies are impregnated with a thermosetting resin thereby hardening the construction. The hardness of the impregnated felt plies restricts movement in the radial direction while movement in the axial direction is determined by the elastomeric sheet.

DETAILED DESCRIPTION OF THE INVENTION

This application is better understood when read in connection with U.S. Pat. application No. 152,698 filed on the same date as the present application, in the names of Drexler and Gibbs issued Sept. 12, 1972 as U.S. Pat. No. 3,691,416 and assigned to the assignee of the present application.

Referring to FIG. 1 there is shown a portion of a dynamoelectric machine frame 11 and a portion of an outer floating axial support 13 which is used to rigidly support stator bars (not show) extending outwardly from the stator core (not shown) of the dynamoelectric machine. A support ring 15 is concentrically aligned with the stator core and is supported by the dynamoelectric machine by means of a fastener (not shown) passing through a block spacer 17.

The subject invention, a unidirectional flexible insulating support spacer element shown generally 21 may be seated in a groove 23 formed within the interior diameter of the support ring. The outer floating axial support 13 is positioned adjacent the element 21 and tied by means of a resin impregnated, kinked roving tie wrap 25 extending around the ring support, the element 21 and through a hole 27 in the outer floating support. As earlier discussed, this construction has been more fully explained in copending Pat. application No. 152,698 now U.S. Pat. No. 3,691,416. The double arrow legend in FIG. 1 illustrates the direction of axial movement (in the plane of the sheets) expected as will be later explained under "Operation of the Invention."

Referring now to FIG. 2, the proposed construction of the unidirectional flexible insulating support spacer element will be described. The element is comprised of a bonded sandwich type construction having upper relatively thick and lower plies 31 and 35 respectively of a felt strip material. The number of plies may be increased to vary the size of the element and the density of the felt material may be varied so as to vary the degree of conformability.

In between the upper and lower plies, sandwiched therein, there is a relatively thin eleastomeric sheet 39. This elastomeric sheet allows the freedom of motion restricted to one plane dependent upon the orientation of the sheet. The maximum amount of motion accommodated can be varied by choosing elastomeric sheets of different sizes and different elastic properties.

The insulating support spacer member is constructed by bonding the felt plies and the elastomeric sheet together by a thin film of adhesive 41. The adhesive is applied taking care so as not to saturate the felt and therefore destroy its conformability. The adhesive may be of a kind that will satisfy the requirements or bond strength and of compatibility with the elastomeric sheet and with the inpregnant that is later used to saturate the felt. For example, many epoxy adhesives that cure at room temperature can be chosen for the adhesive. This element already assembled is ready for use and has no limit on shelf life.

The felt may be any of those available. The choice of the nature of fibers in the felt will depend primarily on end use heat resistance requirements and on the degree of conformability required. For example, polyester fiber felt available in many different thicknesses and densities can be adequate in many cases.

The elastomeric sheet may be any rubber. The choice will depend on the amount of motion expected and on the heat resistance required. For example, a 0.040 inch thick sheet of a polyacrylic rubber can be used in many cases.

During the final assembly, i.e., when the support spacer element is put into the dynamoelectric machine the felt is saturated with an impregnant to harden the element. A wide variety of impregnants are available and the choice will depend on the mechanical and heat resistance requirements and on whether the subsequent heat cure is possible or desirable. Any of many epoxy and polyester resin systems can be used. Very short gel time, room temperature curing materials can be used as well as high temperature curing materials.

OPERATION OF THE INVENTION

This invention is practiced by inserting the insulated, unidirectional flexible element into an end winding support such as is shown in FIG. 1 or as is shown in the previously cited U.S. Pat. application No. 152,698, now U.S. Pat. No. 3,691,416. At this point, the previously conformable sandwich element may be impregnated with a thermosetting resin so that the felt strips become hard allowing good compressive resistant qualities required for support in the radial direction (or direction normal to the sheets). Meanwhile the elastomeric sheet remains flexible and thus movement is permitted in the axial direction (or direction in the plane of the elastomeric sheet).

While there is shown what is at present considered to be the preferred embodiment of the invention, it is, of course, understood that various other modifications may be made therein, and it is intended to cover in the appended claims all such modifications as fall within the true spirit and scope of the invention.

What is claimed is:

1. In combination with a support system in the end winding region of a dynamoelectric machine, and disposed therein; at least one spacer element for allowing limited movement in the axial direction and having substantially zero compressibility in the radial direction comprising:
    a first relatively thick, incompressible, ply of a resin impregnated felt strip;
    a second relatively thick, incompressible ply of a resin impregnated felt strip; and,
    a relatively thin, elastomeric sheet disposed between said first and second incompressible plies and bonded thereto, whereby compressive stressing in a plane normal to the element is resisted while movement in the plane of the element is allowed.

2. The element as recited in claim 1 wherein the elastomeric sheet is bonded to said first and second plies by means of an epoxy adhesive.

3. The element as recited in claim 1 wherein the felt strip is a polyester fiber felt strip.

4. The element as recited in claim 1 wherein the elastomeric sheet is comprised of a rubber material.

5. The element as recited in claim 1 wherein the felt strip is impregnated with an epoxy resin.

6. The element as recited in claim 1 wherein the felt strip is impregnated with a polyester resin.

7. The element as recited in claim 1 wherein the thickness of the elastomeric sheet is on the order of forty-thousandths of an inch.

* * * * *